Nov. 13, 1945.  W. B. WHELAN  2,388,889
ROTARY ELECTRICAL APPARATUS
Filed June 23, 1943   2 Sheets-Sheet 2

William B. Whelan
INVENTOR.
BY Milo B. Stevens & Co.
ATTORNEYS.

Patented Nov. 13, 1945

2,388,889

UNITED STATES PATENT OFFICE 2,388,889

ROTARY ELECTRICAL APPARATUS

William B. Whelan, Chicago, Ill.

Application June 23, 1943, Serial No. 491,984

4 Claims. (Cl. 171—228)

My invention relates to electrical apparatus, and more particularly to inhibiting sparking action therein, and one of my objects is to provide an improved arrangement of the character indicated which is of simple construction.

Another object of the invention is to provide means for the above purpose which are highly efficient in use.

A further object of the invention is to design the invention for economical production.

Figure 1:
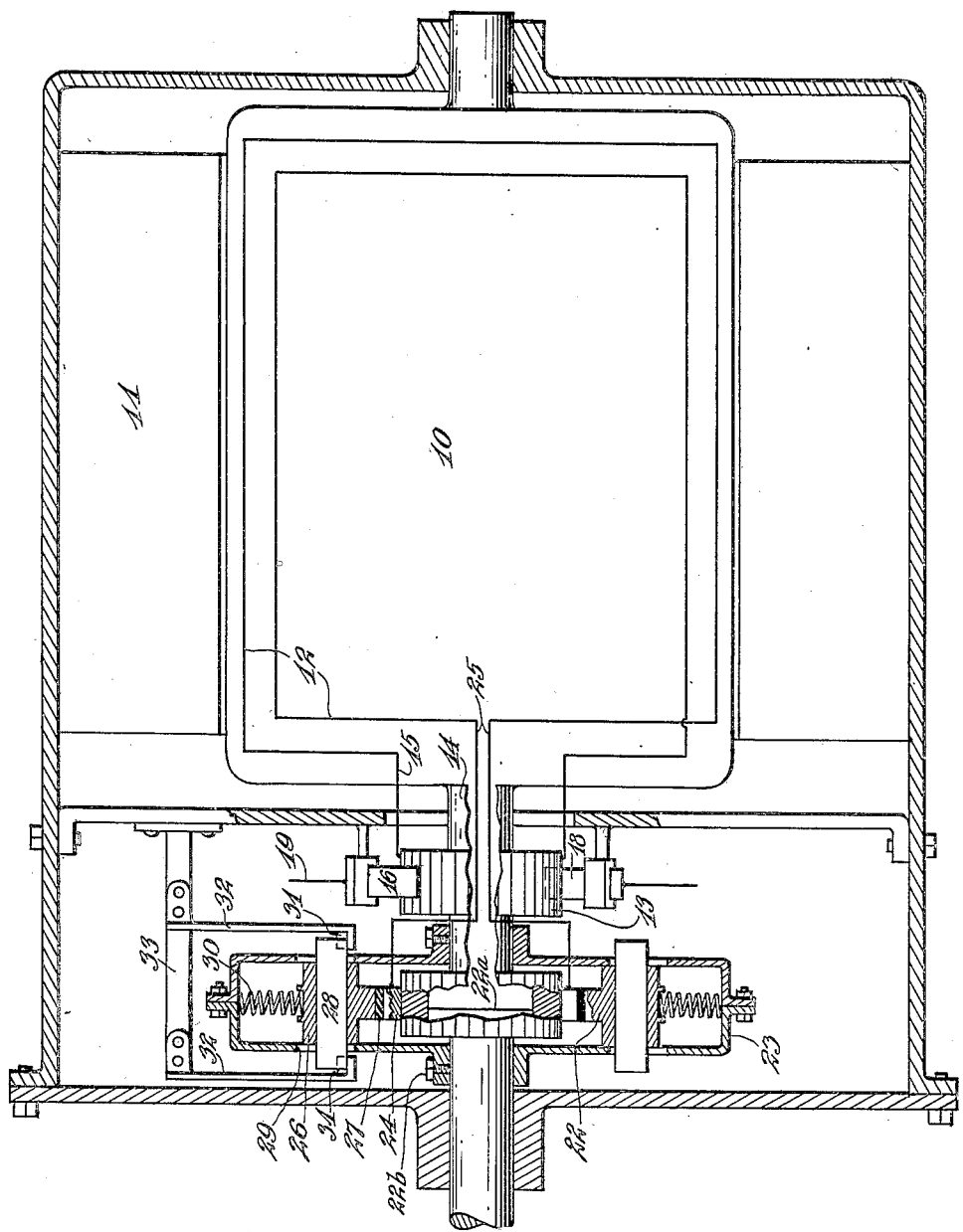
Fig. 1 is a longitudinal section and partial schematic view of an electrical generator or motor embodying the invention and in which certain wiring has been illustrated diagrammatically.

Referring specifically to the drawings, the generator is shown with an armature 10, field magnets 11, coils 12, (of which but one winding is illustrated diagrammatically) a commutator 13, and the shaft 14 typical of an ordinary two pole electrical generator. The ends 15 of the coils 12 are connected to the segments of the commutator 13 in the usual way, but mean terminals 25 of each coil winding 12 are connected to carbon switch blocks 24 as best indicated in Fig. 1.

Figure 2:
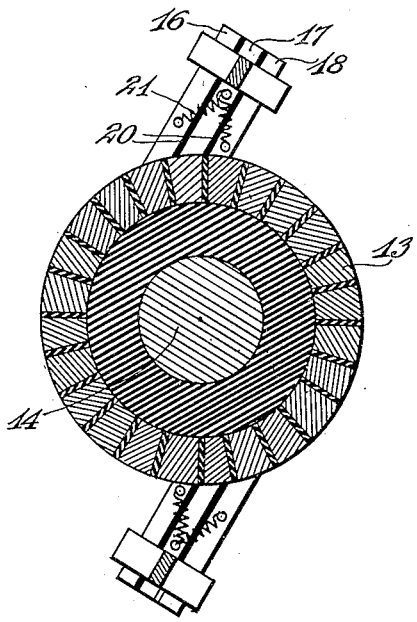
Fig. 2 is a sectional view of the commutator and brushes of the generator.
Figure 3:
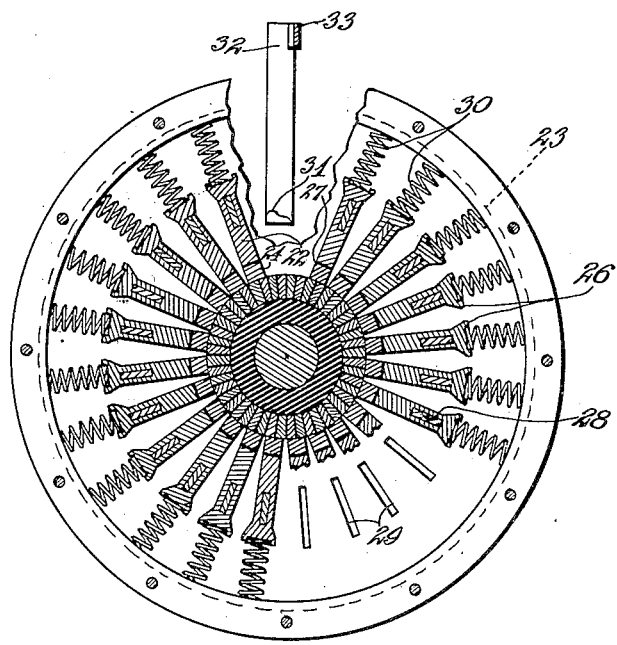
Fig. 3 is a sectional view of a circuit breaking arrangement employed in the apparatus.

The brushes cooperating with the commutator 13 are made in three sections 16, 17, and 18 assembled as best indicated in Fig. 2, with the central section 17 connected with the external circuit 19 and the end sections 16 and 18 separated from the central sections 17 by means of insulation 20. The end sections 16 and 18 are electrically connected with the central sections 17 by means of heavy squelch resistances 21 as indicated. Squelch resistances of which many varieties are commercially available and may be employed to reduce sparking under the brushes during the normal operation thereof since the property of these resistance elements is to afford a variable ohmage characteristic inverse to the general voltage, as will be readily understood by those skilled in the art. It is to be noted from Fig. 2, wherein the brush assembly 16, 17, 18 is indicated as disposed obliquely, that the width of each brush component is slightly smaller in terms of radial angles of the commutator 13 than any one of the commutator segments which are preferably of equal angles and equally spaced by the intervening insulation. Accordingly the three brushes 16, 17 and 18 together with their insulation spacing 20 are designed to span more than two commutator segments, so that during operation with the commutator turning counter-clockwise in Fig. 2 the foremost brush 18 which like the trailing brush 16 is connected by means of the squelch resistance 21 to the central brush 17 engages its segment, communicating a reduced voltage with respect to the central segment 17. For this reason sparking upon engagement of the forerunner brush 18 is correspondingly diminished.

As a means for reducing sparking of the central brush 17, I provide circuit breaking means for each armature coil comprising a rotary assembly 22 fixed to the armature shaft and made up of commutator segments similar to the construction of the commutator 13, but having diametrically opposite segments electrically connected to each other as indicated at 22a in Fig. 1. The assembly 22 is surrounded and enclosed by a casing 23 which is fixed to the armature shaft 14 by bolts 22b or other suitable means, and revolves therewith. The segments of the assembly 22 may correspond in number and arrangement with the segments of commutator 13 and are insulated from each other in the same manner.

A circuit breaker 24 is provided for each segment of the assembly 22 and normally rests in contact therewith, said circuit breakers being connected as indicated by the wires 25 in series with the corresponding armature coils 12 as indicated in Fig. 1. Each circuit breaker 24 is carried by a cross head 26, and comprises a carbon electrode 24 electrically insulated from the main body of cross head 26 by spacers 27. Each cross head 26 carries a transverse guide bar 28 operating in radial guide slots 29 in the sides of the casing 23, and is normally present inwardly by means of a compression spring 30. Thus, each circuit breaker 24 is held normally in electrical contact with its corresponding pair of segments of the assembly 22 as will be readily understood, so that the circuit breakers 24 are connected in series in the corresponding coils 12 of the armature 10.

A pair of cam members 31 are arranged as shown on hangers 32 depending from a supporting bracket 33, such cam members being set in the circular path of the ends of the guide bars 28. Thus, as each guide bar 28 passes over the cams, the corresponding circuit breaker 24 is elevated from the corresponding segment of the assembly 22, breaking the circuit of the corresponding coil 12, and interrupting the flow of current to the segment upon which the central brush 17 is momentarily entering into contact until said brush has substantially engaged the surface of said segment. The cams 31 are so positioned that at the time of the greatest tendency for sparking under the brushes 17, the coil connected with the external circuit is automatically short-circuited by the collector brushes. While the circuit is thus interrupted with reference to a particular segment as it is approached by the brush 17 the adjacent circuits or those of the adjacent segments of commutator 13 continue nevertheless, since the switches 24 pertaining to their terminal wires 25 are not at that instant raised by the cams 31 so that excitement of their related coils, diminished by the resistance elements 21, obtains during the instant that the particular segment is momentarily de-energized. Thus, sparking is greatly reduced or actually prevented. In this way an electrical apparatus employing brushes and a commutator, such as an electrical generator or motor, may be constructed in which the sparking under the brushes will be greatly minimized if not actually eliminated. The specific arrangement of parts disclosed is a simple and effective one for the purpose.

While I have described the invention along specific lines, various minor changes or refinements may be made therein without departing from its principle, and I desire to consider such changes and refinements as coming within the scope and spirit of the appended claims.

I claim:

1. In combination with a dynamo electric machine having an armature, coils, segmental commutator, and brushes, a rotary segmental assembly driven in synchronism with the commutator and corresponding in structure therewith, the rotary segmental assembly having its diametrically opposite segments electrically connected to each other, said assembly including a shiftable circuit breaker normally making electrical contact with each of said segments, the diametrically opposite circuit breakers being connected in series with each coil, and means for successively shifting each circuit breaker to break each coil circuit as the brushes pass the corresponding commutator segments.

2. In an electric dynamo, a rotary armature having a plurality of windings, a segmental commutator having diametrically opposite segments thereof connected to each of said windings, a circuit breaker rotatable in synchronism with said commutator and comprising a circumferential series of segments insulated from each other, the diametrically opposite ones of said last segments being electrically connected, a contact element normally engaging each of said last segments, diametrically opposed contact elements being connected to the respective windings to which the diametrically opposite commutator segments are connected, and means operative upon rotation of the circuit breaker for successively moving the contact elements out of engagement with the associated segments during a brief interval when the brushes are beginning to make contact with the segments connected to the respective windings.

3. The structure according to claim 2 wherein said circuit breaker comprises a frame rotatable with said series of segments, said contact elements being radially movable in said frame, spring means supported in the frame normally urging the contact elements into engagement with the respective segments, and fixed cam means disposed for successive engagement with the contact elements for moving same out of contact with the segments against the action of said spring means.

4. The structure according to claim 2, wherein each of said contact elements is carried by and insulated from a cross head, a spring normally urging each cross head radially inward for contact of the respective element with a segment and cam means for moving the respective cross heads radially outward for breaking contact between the respective elements and segments.

WILLIAM B. WHELAN.